US011157205B2

(12) United States Patent
Cheru et al.

(10) Patent No.: US 11,157,205 B2
(45) Date of Patent: Oct. 26, 2021

(54) OBJECT STORAGE SYSTEM WITH CONTROL ENTITY QUOTA ENFORCEMENT

(71) Applicant: Western Digital Technologies, Inc., San Jose, CA (US)

(72) Inventors: Tomy Ammuthan Cheru, Thrissur (IN); Gunneswara Rao Marripudi, Fremont, CA (US); Veena Joshi, Fremont, CA (US); Avik Sil, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 123 days.

(21) Appl. No.: 16/441,555

(22) Filed: Jun. 14, 2019

(65) Prior Publication Data

US 2020/0159451 A1    May 21, 2020

(30) Foreign Application Priority Data

Nov. 15, 2018 (IN) .............................. 201841043048

(51) Int. Cl.
*G06F 3/06*    (2006.01)
(52) U.S. Cl.
CPC .......... *G06F 3/0659* (2013.01); *G06F 3/0611* (2013.01); *G06F 3/0653* (2013.01); *G06F 3/0673* (2013.01); *G06F 3/0605* (2013.01); *G06F 3/067* (2013.01); *G06F 3/0658* (2013.01)

(58) Field of Classification Search
CPC .... G06F 3/0659; G06F 3/0673; G06F 3/0653; G06F 3/0611; G06F 3/0605; G06F 3/0658; G06F 3/067
See application file for complete search history.

(56) References Cited

U.S. PATENT DOCUMENTS

| | | | |
|---|---|---|---|
| 2002/0129346 A1* | 9/2002 | Lee ........................... | G06F 8/20 717/163 |
| 2011/0191485 A1* | 8/2011 | Umbehocker ........ | G06F 3/0605 709/229 |
| 2015/0234879 A1 | 8/2015 | Baldwin et al. | |
| 2017/0220500 A1* | 8/2017 | Tong ....................... | G06F 3/067 |
| 2017/0364280 A1* | 12/2017 | Kim ........................ | G06F 16/13 |
| 2019/0228080 A1* | 7/2019 | Abe ......................... | G06F 3/065 |

* cited by examiner

*Primary Examiner* — Masud K Khan
(74) *Attorney, Agent, or Firm* — Patent Law Works LLP

(57) ABSTRACT

Example object storage systems, bookkeeping engines, and methods provide quota enforcement for control entities, such as accounts, users, and buckets. An object data store is configured to enable control entities to access data objects associated with each control entity. Quota thresholds associated with requesting control entities are determined. Object usage values corresponding to the quota thresholds are determined. Data object access requests are denied responsive to object usage values exceeding quota thresholds for the requesting control entities.

20 Claims, 11 Drawing Sheets

OBJECT STORAGE SYSTEM WITH CONTROL ENTITY QUOTA ENFORCEMENT

TECHNICAL FIELD

The present disclosure generally relates to data storage, and in a more particular example, to distributed object storage systems with quota bookkeeping for multiple control entities.

BACKGROUND

Often, distributed object storage systems are used to store large amounts (e.g., terabytes, petabytes, exabytes, etc.) of data, such as objects in a distributed and fault tolerant manner with a predetermined level of redundancy. These distributed object storage systems may be maintained by service providers supporting multiple control entities, such as enterprise accounts, account users, and data buckets or other logical groupings of data access privileges.

Object storage systems may store data in data objects. Data objects may be stored in data buckets or similar logical partitions that provide a level of access control. For example, an account and user may be required to have a set of credentials associated with a given bucket to be able to access data objects stored within. In general, buckets are associated with enterprise accounts that reflect ownership of the data contained within the bucket. In some contexts, a distributed object storage system may include multiple enterprise accounts storing data objects on the same storage system hardware. Multiple users may be associated with enterprise accounts and limit access to particular buckets within the set of buckets associated with an enterprise account. Each user may have access to a particular bucket or set of buckets. In some context, super-user accounts may be associated with buckets across enterprise accounts. Similarly, some distributed storage systems may include permissions or other credentials that can enable an account or user to access buckets owned by other accounts or users.

Within distributed object storage systems with multiple control entities, it may be desirable to allocate and track storage used by different control entities. In some contexts, allocation and tracking of storage used may contribute to the calculation of payment for storage services (e.g. metering and billing) and/or management of storage allocation to different companies, departments, projects, users, or other logical units of resource management. Tracking of these storage allocations may be referred to as bookkeeping.

Within this context, it may be advantageous to place limits or quotas on the amount of storage resources that may be used by any given control entity, such as accounts, users, and buckets. These quotas may be based on various storage parameters, such as storage capacity (e.g. bytes or blocks used), number of objects, and/or number of transactions (e.g. read operations, write operations, etc.).

Within distributed object storage systems, a need may exist for bookkeeping systems and methods that provide data access control based on predefined quotas concurrently for a plurality of control entities and/or control entity types (e.g. accounts, users, buckets, etc.), while managing read/write overhead.

SUMMARY

Various aspects for quota enforcement, particularly, object storage systems and methods with control entity quota enforcement are described.

One general aspect includes a system that includes an object data store configured to enable a plurality of control entities to access data objects associated with each control entity of the plurality of control entities. A bookkeeping engine is configured to: determine at least one quota threshold associated with a requesting control entity of the plurality of control entities; determine at least one object usage value corresponding to the at least one quota threshold; and deny, responsive to the at least one object usage value exceeding the at least one quota threshold associated with the requesting control entity, a data object access request from the requesting control entity.

Implementations may include one or more of the following features. The plurality of control entities may include control entities selected from data object buckets, user profiles, and object data store accounts. At least one quota threshold associated with the requesting control entity may include a first quota threshold and a second quota threshold. The bookkeeping engine may be further configured to generate, responsive to the at least one usage value exceeding the first quota threshold, a notification event. Denying the data object access request may be responsive to the at least one object usage value exceeding the second quota threshold. The first quota threshold may be a percentage of the second quota threshold, where the percentage is less than one hundred percent. The at least one quota threshold associated with the requesting control entity may include a plurality of quota thresholds. The at least one object usage value may include a plurality of object usage values corresponding to the plurality of quota thresholds. Responsive to the data object access request, the bookkeeping engine may be further configured to: execute determining the at least one quota threshold for each quota threshold of the plurality of quota thresholds; execute determining the at least one object usage value for each object usage value of the plurality of object usage values; and execute denying the data object access request for at least one quota threshold of the plurality of quota thresholds being exceeded by a corresponding object usage value of the plurality of object usage values. The at least one quota threshold associated with the requesting control entity may be selected from a number of data objects, a storage capacity; or a transactional threshold. The at least one object usage value may be selected from a corresponding number of data objects value, storage capacity value, or transactional value. The bookkeeping engine may be further configured to respond to each write request to the object data store. A control entity configurator may be configured to: assign at least one quota threshold to each of the plurality of control entities; and selectively change, responsive to the at least one object usage value exceeding the at least one quota threshold associated with the requesting control entity, at least one quota threshold associated with the requesting control entity. An object usage calculator may be configured to calculate the at least one object usage value based on data objects in the object data store. An object manager may be configured to remove, responsive to the at least one object usage value exceeding the at least one quota threshold associated with the requesting control entity, data objects from the object data store.

One general aspect includes a computer-implemented method, including: receiving a data object access request associated with a requesting control entity, where the requesting control entity is configured to access data objects associated with the requesting control entity; determining at least one quota threshold associated with the requesting control entity; determining at least one object usage value corresponding to the at least one quota threshold; and denying, responsive to the at least one object usage value exceeding the at least one quota threshold associated with the requesting control entity, the data object access request from the requesting control entity.

Implementations may include one or more of the following features. The data objects may be stored in an object data store. The requesting control entity may be a control entity from a plurality of control entities associated with the object data store. The plurality of control entities may each be associated with at least one data object in the object data store. The plurality of control entities may include control entities selected from data object buckets, user profiles, and object data store accounts. The computer-implemented method may further include: assigning at least one quota threshold to each of the plurality of control entities; and selectively changing, responsive to the at least one object usage value exceeding the at least one quota threshold associated with the requesting control entity, at least one quota threshold associated with the requesting control entity. The at least one quota threshold associated with the requesting control entity may include a first quota threshold and a second quota threshold. Denying the data object access request may be responsive to the at least one object usage value exceeding the second quota threshold. The computer-implemented method may also include generating, responsive to the at least one usage value exceeding the first quota threshold, a notification event. The first quota threshold may be a percentage of the second quota threshold, where the percentage is less than one hundred percent. The at least one quota threshold associated with the requesting control entity may include a plurality of quota thresholds. The at least one object usage value includes a plurality of object usage values corresponding to the plurality of quota thresholds. Determining the at least one quota threshold may be executed for each quota threshold of the plurality of quota thresholds. Determining the at least one object usage value may be executed for each object usage value of the plurality of object usage values. Denying the data object access request may be executed responsive to at least one quota threshold of the plurality of quota thresholds being exceeded by a corresponding object usage value of the plurality of object usage values. The at least one quota threshold associated with the requesting control entity may be selected from a number of data objects, a storage capacity, or a transactional threshold. The at least one object usage value may be selected from a corresponding number of data objects value, storage capacity value, or transactional value. The computer-implemented method may further include: calculating the at least one object usage value based on data objects associated with the requesting control entity in an object data store; and removing, responsive to the at least one object usage value exceeding the at least one quota threshold associated with the requesting control entity, data objects associated with the requesting control entity from the object data store.

One general aspect includes a system that includes an object data store configured to enable a requesting control entity to access data objects associated with the requesting control entity. Means are provided for receiving a data object access request associated with the requesting control entity. Means are provided for determining at least one quota threshold associated with the requesting control entity. Means are provided for determining at least one object usage value corresponding to the at least one quota threshold. Means are provided for denying, responsive to the at least one object usage value exceeding the at least one quota threshold associated with the requesting control entity, a data object access request from the requesting control entity.

Implementations may include one or more of the following features. The at least one quota threshold associated with the requesting control entity may include a first quota threshold and a second quota threshold. Means may be provided for denying the data object access request responsive to the at least one object usage value exceeding the second quota threshold. Means may be provided for generating, responsive to the at least one usage value exceeding the first quota threshold, a notification event.

The various embodiments advantageously apply the teachings of distributed object storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve data object access control for enforcing quota limits, such as by determining quota status for various control entities associated with a data access request and denying access when one or more quotas are exceeded. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
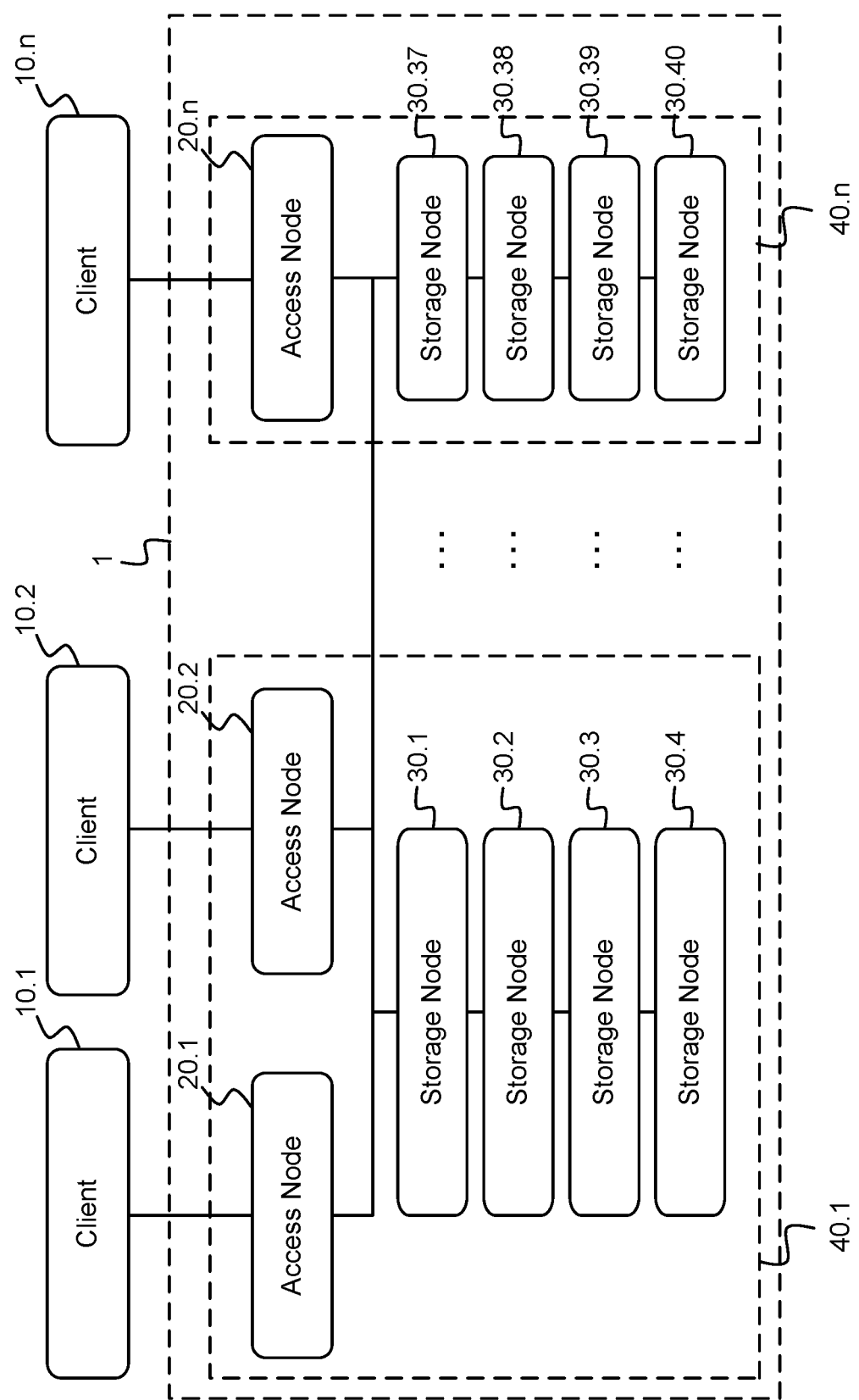
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.*n* for accessing data objects through one or more access nodes 20.1-10.*n*. The connection between the distributed storage system 1 and clients 10 could, for example, be implemented as a suitable data communication network.

Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through REST application programming interfaces (APIs). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
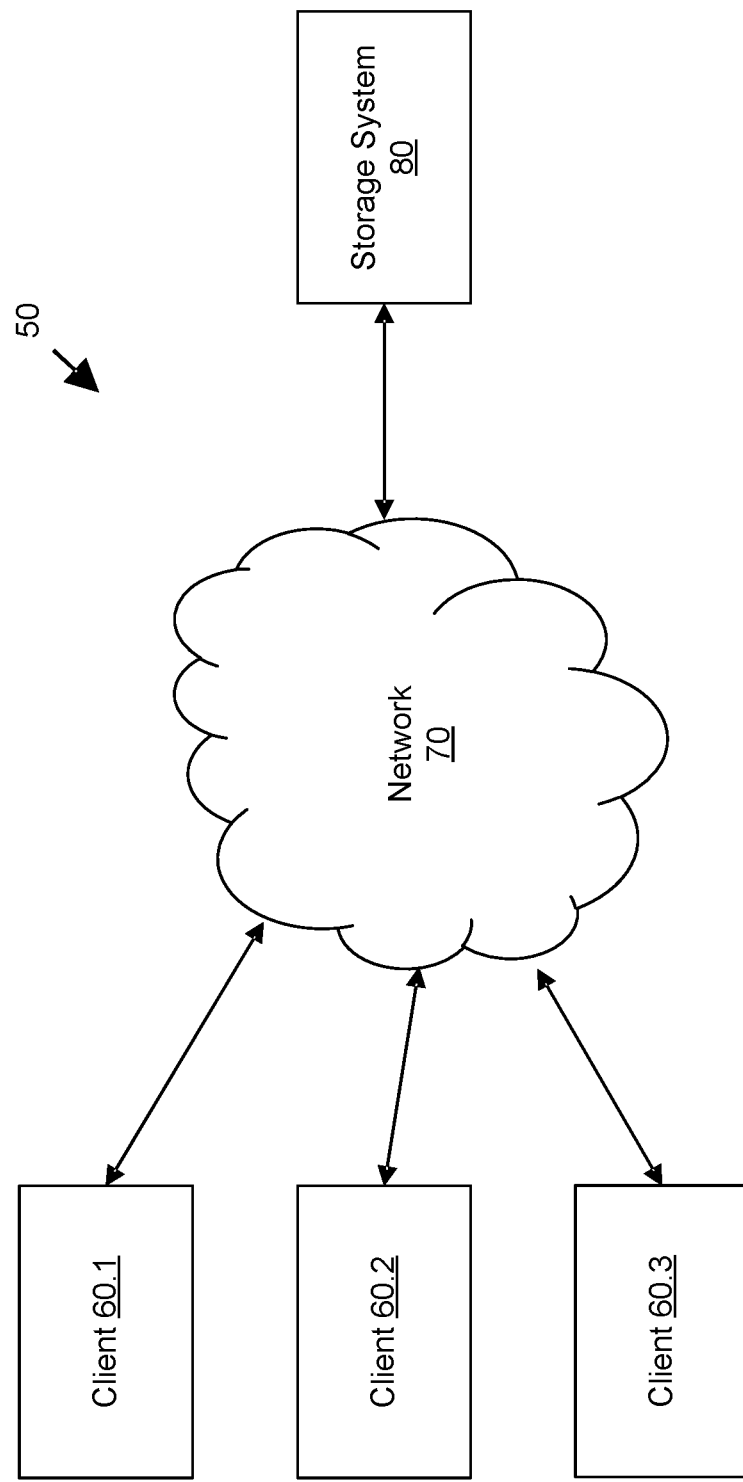
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
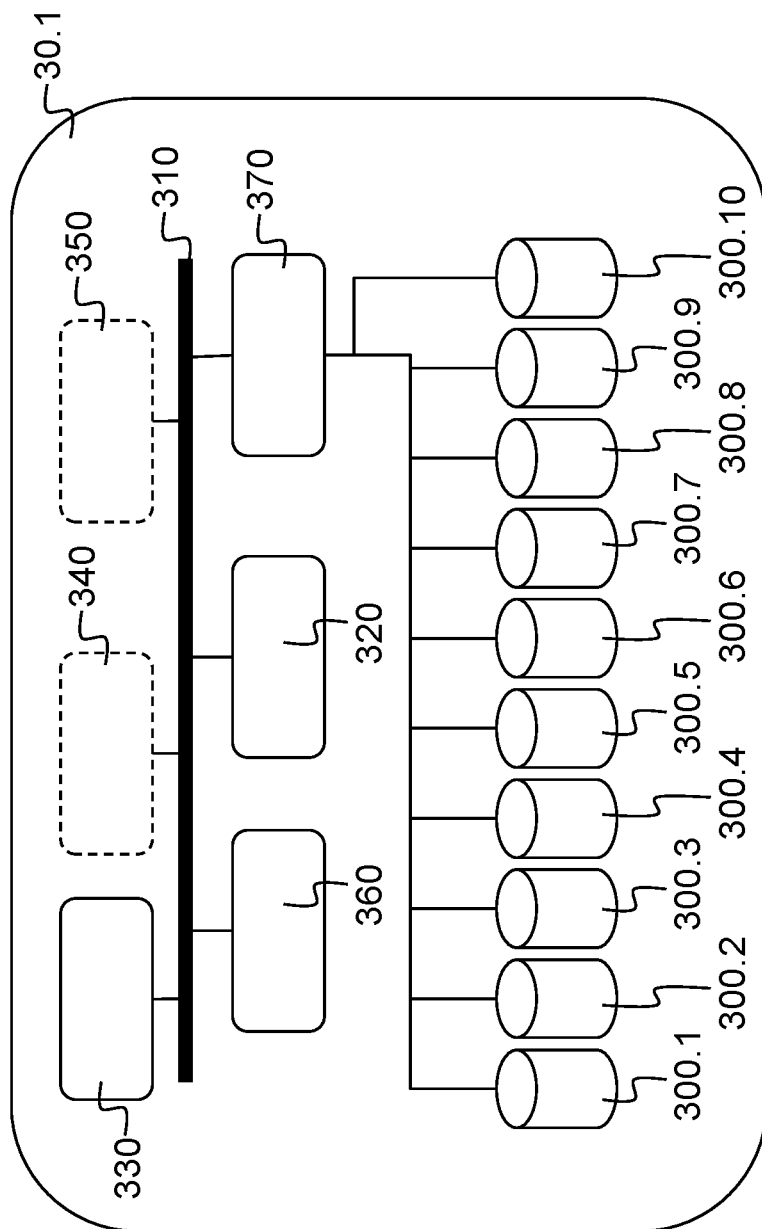
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
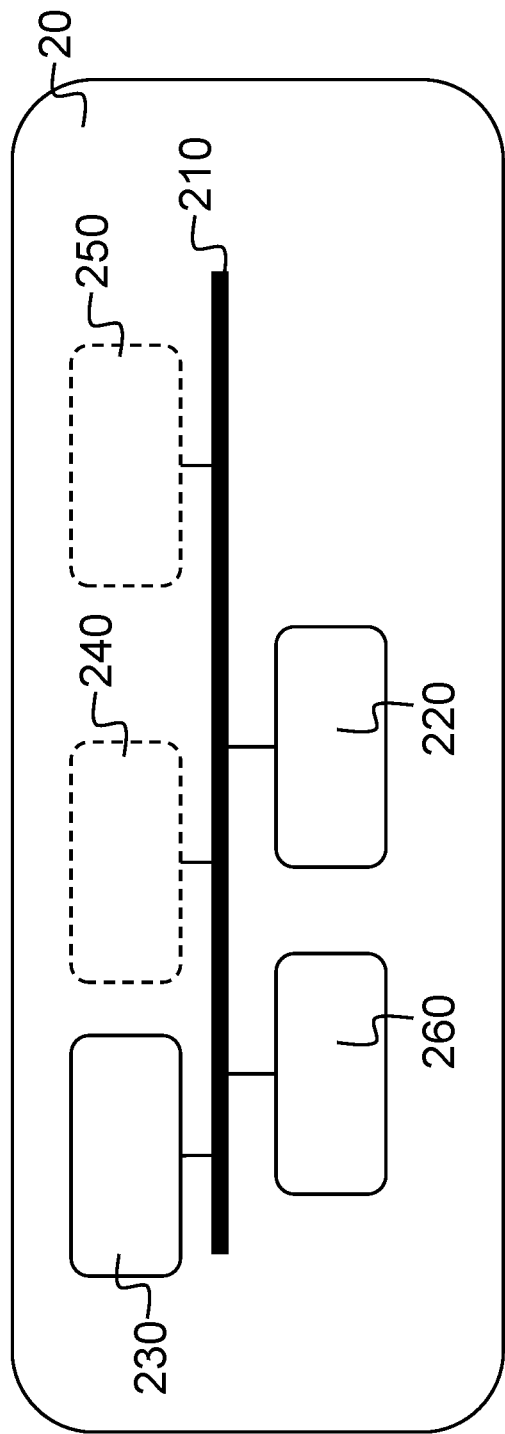
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, and one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 220 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
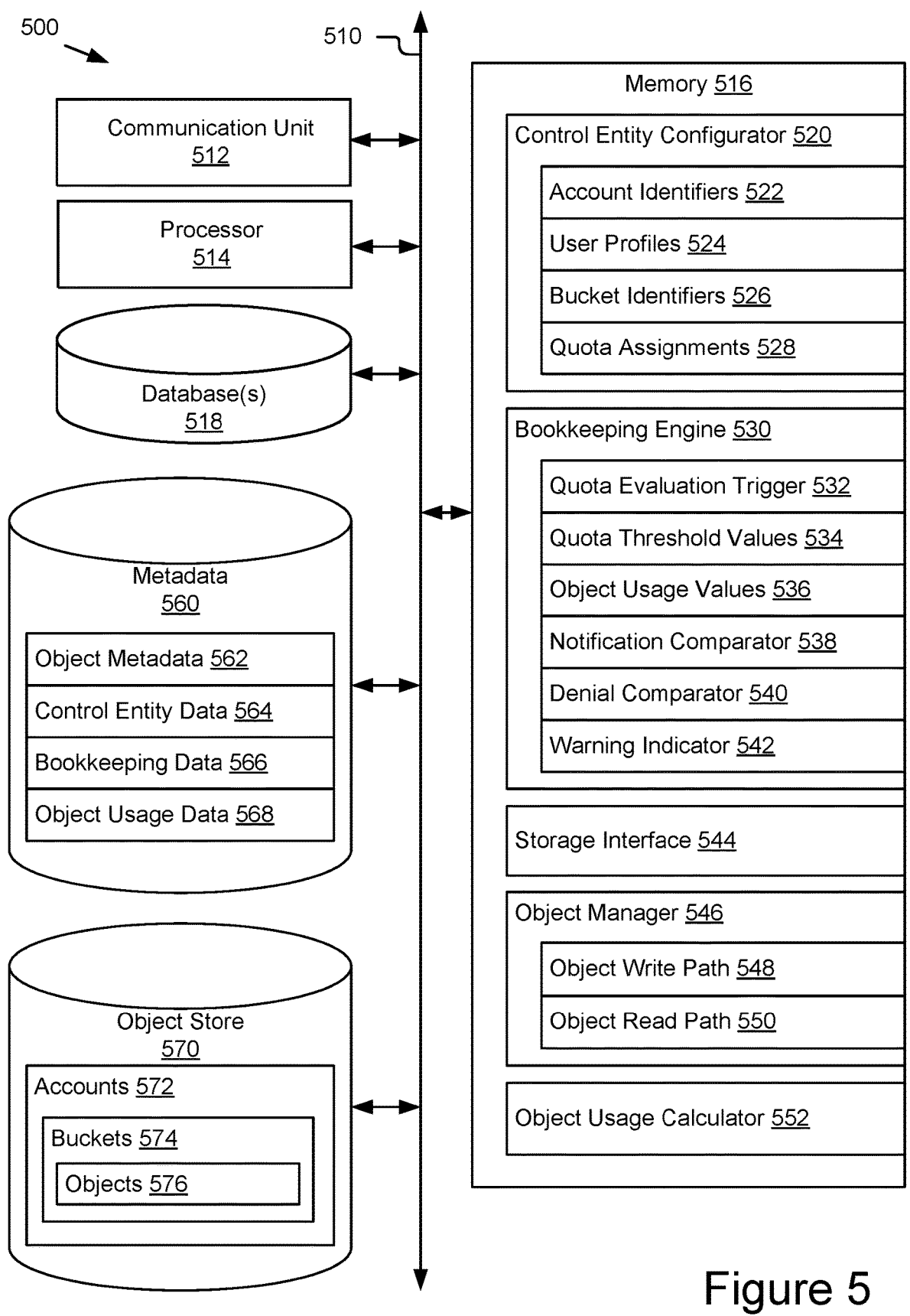
FIG. 5 schematically illustrates some example elements of an object storage system for the distributed storage system of FIG. 1.

FIG. 5 schematically shows selected modules of an access node or controller node with a bookkeeping engine for control entity quota enforcement and supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions.

Object storage system 500 may include a bus 510 interconnecting at least one communication unit 512, at least one processor 514, and at least one memory 516. Bus 510 may include one or more conductors that permit communication among the components of object storage system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 560 and object store 570. Databases may include one or more data structures for storing, retrieving, indexing, searching, filtering, etc. of structured and/or unstructured data elements. In some embodiments, metadata store 560 may be structured as reference data entries and/or data fields indexed by metadata key value entries related to data objects stores in object store 560. Object store 570 may include data objects comprised of object data (such as host data), some amount of metadata (stored as metadata tags), and a GUID. Metadata store 560, object store 570, and/or other databases or data structures may be maintained and managed in separate computing systems, such as storage nodes, with separate communication, processor, memory, and other computing resources and accessed by object storage system 500 through data access protocols. Metadata store 560 and object store 570 may be shared across multiple object storage systems 500.

Object storage system 500 may include a plurality of modules or subsystems that are stored and/or instantiated in memory 516 for execution by processor 514. For example, memory 516 may include a control entity configurator 520 for receiving, generating, and/or storing control entity configurations for accessing object store 560. Memory 516 may include a bookkeeping engine 530 for calculating and tracking control entity metering and billing, including the management of control entity quotas and data access.

Memory 516 may also include other modules, functions, methods, or operations related to object storage that may be configured to support control entity configurator 520 and/or bookkeeping engine 530. In some embodiments, these functions may be defined as part of general object storage, data object access, or similar storage management operations. In the example shown, storage interface 544, object manager 546, and object usage calculator 552 may call and/or be called by other modules, such as control entity configurator 520 and/or bookkeeping engine 530 and/or available to other clients, libraries, systems, or users through one or more APIs. In some embodiments, control entity configurator 520 and/or bookkeeping engine 530 may be integrated into storage interface 544 and/or object manager 546, or they may be managed as separate libraries or background processes (e.g. daemon) through an API or other interface.

Control entity configurator 520 may include interfaces, functions, and/or data structures for configuring control entities with access privileges or associations with data objects in object store 570. For example, control entity configurator 520 may include one or more user interfaces for setting up and modifying enterprise accounts, users, buckets, and other control entities. In some embodiments, control entity configurator may include or access one or more tables or other data structures for mapping, storing, and/or managing account identifiers 522, user profiles 524, and bucket identifiers 526 for the different control entity types (accounts, users, and buckets) in object storage system 500. For example, metadata 560 may include control entity data 564 for storing control entity configuration information or data structures.

Control entity identifiers may be associated with access rights to data objects in object store 570 such that each data object may only be accessed through associated account identifiers 522, user profiles 524, and bucket identifiers 526. For example, each object data access request and/or associated metadata or session information may include the account identifier, user profile, and bucket identifier for the requesting user (and associated requesting account) and target data object. In some embodiments, account identifiers 522, user profiles 524, and/or bucket identifiers 526 may be associated with credentials that are validated by storage interface 544 before allowing access to the target data object.

Account identifiers 522 may include account information for a storage service. Account identifiers 522 may be associated with one or more users for accessing data objects and one or more buckets for containing or organizing data objects. In some embodiments, account identifiers 522 may include an account number, account name, account type, and other information uniquely describing a particular account.

User profiles 524 may include user information, including one or more user identifiers for uniquely identifying a specific user. User profiles 524 may be associated with one or more accounts with ownership of data objects and one or more buckets for containing or organizing data objects. In some embodiments, user profiles 524 may include user name, login credentials, user type, and other information uniquely describing a particular user.

Bucket identifiers 526 may include bucket information, including a unique bucket identifier value for uniquely identifying a specific data bucket. Bucket identifiers may be associated with one or more accounts with ownership of data objects and one or more users with access privileges to the data bucket. In some embodiments, bucket identifiers 526 may be include in each object data access request, along with a globally unique identifier (GUID) for the target data object in a selected bucket. In some configurations, other logical groupings of data objects may be used as control entities for accessing data objects, such as data groups, partitions, hierarchies, etc.

Control entity configurator 520 may include quota assignments 528 for one or more of the configured control entities. For example, storage usage quotas may be associated account identifiers 522, user profiles 524, and bucket identifiers 526 such that each control entity is only allowed to use its allotted quota of storage. Quota assignments 528 may include a maximum usage value for an aggregate object usage value for all objects associated with that control entity.

For example, a maximum storage capacity usage quota value may be set of an account identifier that means the aggregate storage capacity usage of all data objects associated with that account may not exceed the quota value. A storage capacity usage quota value for a user profile may mean the aggregate storage capacity used by all objects associated with that user may not exceed the quota value. A storage capacity usage quota value for a bucket identifier may mean the aggregate storage capacity used by all object in that bucket may not exceed the quota value.

In some embodiments, quota values may be assigned for one or more control entities based on multiple object usage parameters. For example, quota assignments 528 for each account may include a storage capacity quota, a number of objects quota, a number of operations quota, and/or other object usage quotas. Similar quota assignments 528 may be configured for users and buckets. Each of these quotas may be represented by a different quota value corresponding to the relevant object storage parameter. Note that not all control entity types may be limited by the same object usage parameters. For example, accounts may have a storage capacity quota, while users have a number of operations quota and buckets have a number of objects quota.

In some embodiments, quota values may be assigned for one or more control entities based on multiple response levels. For example, quota assignments 528 for each control entity and usage quota type may include a hard limit and a soft limit. For example, a hard limit may define a quota value that if exceeded will cause access to data objects to be denied and an error message to be sent. Note that the hard limit may still allow some data access operations, such as read or delete operations, but require remediation (such as through delete operations) before allowing new write operations. A soft limit may define a quota value that if exceeded will cause a warning to be issued to notify the user, account manager, or other system administrator that the soft limit has been exceeded and there is a danger of reaching the hard limit.

In some embodiments, each response level quota value may be set independently. In some embodiments, each response level quota value may be derived from another response level. For example, the warning or soft quota threshold may be a percentage of the access denial or hard quota threshold, such as 80%.

Additional response levels are also possible. For example, there could be a notification response level at 50% of the hard limit, a warning response level at 80% of the hard limit, the write access denial at 100% of the hard limit, and storage access denial (effectively freezing the relevant control entities) at 120% (perhaps requiring administrative action to remedy). Note that it may be possible in some embodiments to achieve greater that 100% object usage values due to a particularly large object and/or lag in updating usage values (as described below with regard to object usage calculator 552). In some embodiments, response levels may also be responsive to multiple quotas being exceeded, which may increase the severity of the response. For example, if both number of objects and capacity are simultaneously exceeded, a higher response level may be generated by bookkeeping engine 530.

Bookkeeping engine 530 may include interfaces, functions, and/or data structures for managing accountability of usage of the data objects in object store 570, including enforcement of quotas set in control entity configurator 520. In some embodiments, bookkeeping engine 530 tracks one or more usage parameters and associated usage values for metering and billing purposes. For examples, accounts may have associated storage service terms that may include parameter-based limits on the account and/or payment tiers based on usage parameters. In some embodiments, quota assignments 528 may be derived from the storage service terms as a means of managing storage usage and prevent overages that could exceed the budget of the data owner or the allocated capacity of the storage service. Bookkeeping engine 530 may include account owner, user, and/or system administrator interfaces and related functional modules (not shown) that enable metering and billing for accounts. In some embodiments, bookkeeping engine 530 may store data related to various bookkeeping functions in bookkeeping data 566 in metadata store 560.

Bookkeeping engine 530 may be configured for enforcement of quota assignments 528 and may include one or more hardware or software functions for monitoring usage, comparing usage to quotas, and generating responses, including denial of data object access and warnings or other notifications. In some embodiments, bookkeeping engine 530 may include quota evaluation trigger 532, quota threshold values 534, object usage values 536, notification comparator 538, denial comparator 540, and warning indicator 542.

Quota evaluation trigger 532 may include interfaces, functions, and/or parameters for initiating an evaluation of whether one or more quota thresholds have been exceeded. For example, bookkeeping engine 530 may be configured to check quota thresholds periodically (based on elapsed time or number of storage operations), responsive to every storage operation, object data access request, write operation, etc. or based on other trigger conditions (available bandwidth, completion of garbage collection, completion of an iteration of object usage calculation, etc.). In some embodiments, quota evaluation trigger 532 may be configured as a rule set including parameters for managing one or more trigger conditions. For example, a quota evaluation parameter may define the time between quota evaluations or the types of storage operations that trigger a check. In some embodiments, quota evaluation trigger 532 may be hardcoded as part of object write path 548 such that bookkeeping engine 530 checks the quota status every time a write command is received, such as before initiation of the requested write operation through object manager 546.

Quota threshold values 534 may include interfaces, functions, and/or parameters for accessing and/or storing quota threshold values for each quota being monitored by bookkeeping engine 530. For example, quota assignments 528 may generate, receive, and/or store quota threshold values in bookkeeping data 566 for retrieval by bookkeeping engine 530 when evaluating quota status. In some embodiments, an array of values corresponding to various control entities, object storage parameters, and response levels may be maintained for all control entities with access to object store 570. For example, quota threshold values table may be maintained with a column of unique identifiers for the various control entities and additional columns for the various threshold values associated with each control entity.

Object usage values 536 may include interfaces, functions, and/or parameters for accessing and/or storing object usage values for each quota being monitored by bookkeeping engine 530. For example, object usage calculator 552 may generate, receive, and/or store object usage values in object usage data 568 for retrieval by bookkeeping engine 530 when evaluating quota status. In some embodiments, an array of values corresponding to various control entities and object storage parameters may be maintained for all control entities with access to object store 570. For example, an object usage values table may be maintained with a column of unique identifiers for the various control entities and additional columns for the various threshold values associated with each control entity. In some embodiments, object usage values 536 may be generated responsive to each quota evaluation trigger by a query or request to object usage calculator 552, which may calculate and return the requested object usage value(s).

Object usage values 536 may correspond to quota threshold values 534 directly or through some type of transfer function. For example, a number of data objects (count) threshold value may correspond to a number of data object value calculated from the object store 570, a storage capacity (size) threshold may correspond to a storage capacity value calculated from the object store 570, or a transactional threshold value (operations) may correspond to a transactional value calculated from the object store 570.

Notification comparator 538 and denial comparator 540 may be examples of threshold status evaluations for two different response levels. Notification comparator 538 and denial comparator 540 may include interfaces, functions, and/or parameters for comparing quota threshold values 534 to object usage values 536 for each quota being monitored by bookkeeping engine 530. For example, notification comparator 538 and denial comparator 540 may each receive their respective quota threshold values and the corresponding object usage values for a requesting control entity. Notification comparator 538 and denial comparator 540 may each include a comparator function to determine whether the object usage value exceeds the quota threshold value and return a status indicator, such as a flag value, for whether the comparator function was false (not exceeded) or true (exceeded). In some embodiments, notification comparator 538 and denial comparator 540 may use the same comparator function with different threshold values or may be a single function that includes multiple threshold values. For example, the comparator function may use a single hard threshold value to determine a soft threshold value and return a hard positive, soft positive, or negative status indicator. The soft threshold may be expressed as a percentage value of the hard threshold that is less than one hundred percent (100%). As discussed elsewhere, additional response levels and thresholds may be handled by bookkeeping engine 530 and one or more comparators.

In some embodiments, notification comparator 538 and denial comparator 540 may generate status indicators or messages that cause another component to complete a response action, such warning indicator 542 sending a warning message to a user, object manager 546 denying write access, and/or storage interface 544 sending an error message responsive to the storage access request. In some embodiments, notification comparator 538 and/or denial comparator 540 may generate an automated system response, such as through bookkeeping engine 530, storage interface 544, and/or object manager 546. For example, bookkeeping engine 530 may include logic for automatically reallocating quota assignments responsive to a quota being exceeded, such as moving an account, user, or bucket to another usage or billing tier, and/or prompting a user to do so.

Warning indicator 542 may include interfaces, functions, and/or parameters for responding to one or more exceeded quotas detected by bookkeeping engine 530. For example, in response to a soft limit being exceeded, warning indicator 542 may send a warning message to a user associated with one or more impacted control entities. The warning message may include an identification of what thresholds have been exceeded and recommend remedial actions. In some embodiments, warning indicator 542 may include a flag or other indicator value that is available in a data structure or message to other functions, systems, or users for communicating quota status and/or initiating additional automated responses.

Storage interface 544 may include an interface protocol or set of functions and parameters for storing, reading, and otherwise managing data access requests to an associated object storage system and the corresponding metadata data source. For example, storage interface 544 may include functions for reading, writing, modifying, or otherwise manipulating data objects in object store 570 and their respective client or host data and metadata in accordance with the protocols of an object storage system. In some embodiments, storage interface 544 may include a plurality of hardware and/or software modules configured to use processor 514 and memory 516 to handle or manage defined operations of storage interface 544. For any given client request, storage interface 544 may receive a client request and determine one or more operations, such as an object data access request, based on the content of the request. These operations may include metadata operations handled by a metadata manager and/or object data operations handled by object manager 546. The results of these operations may be processed, formatted, and returned to the client, including notifications, such as data access errors for exceeding one or more quotas and/or related quota warnings.

Storage interface 544 may include one or more object storage configurations that define a storage protocol used for validating, managing, and processing object data requests. For example, object storage configurations may generally define the availability of control entity access for any give object or bucket based on control entity configurator 520, as well as specifying how the object storage system manages data access credentials, validation, and other control entity information. Object storage configurations may also define what metadata is collected and stored, as well as whether it is stored in a metadata database, such as object metadata 562 in metadata store 560, in object metadata tags stored in the data objects, and/or a combination thereof.

Object manager 546 may include interfaces, functions, and/or parameters for reading, writing, and deleting object data elements in object store 570. For example, object PUT commands may be configured to write data objects to object store 570 as part of object write path 548. Object write path 548 may include the methods, operations, or functions related to processing a write request received by storage interface 544 into the storage of a data object or portion thereof in object store 570 or a responsive error message for the write request. Object GET commands may be configured to read data from object store 570 as part of object read path. The object read path may include the methods, operations, or functions related to processing a read request received by storage interface 544 into host data retrieved from object store 570 or a responsive error message for the read request. Object DELETE commands may be configured to delete data from object store 570, or at least mark a data object for deletion until a future garbage collection or similar operation actually deletes the data or reallocates the physical storage location to another purpose. Each of these data access operations may include or be responsive to data access validation, such as data access credentials, permissions, and/or the quota-based data access enforcement described with regard to bookkeeping engine 530 above.

Object usage calculator 552 may include interfaces, functions, and/or parameters for retrieving and/or calculating object usage data from metadata 560 and/or object store 570.

For example, object usage calculator 552 may calculate storage capacity, object count, data operations, and/or other usage parameters for data objects in object store 570. In some embodiments, object usage calculator 552 may parse data object entries in metadata store 560 that include data object and/or data operation parameters to generate cumulative object usage values and store them in object usage data 568. For example, object usage calculator 552 may periodically extract storage parameters from one or more logs in metadata 560 to calculate object usage values for data objects. In some embodiments, object usage calculator 552 may manage running usage values for data objects in object usage data 568 and update them responsive to each write, delete, garbage collection, or other operation impacting the usage value.

Object usage calculator 552 may send or otherwise make available object usage values for use by other clients, libraries, systems, or users through one or more APIs. For example, object usage values 536 in bookkeeping engine 530 may be generated and/or published by object usage calculator 552. In some embodiments, object usage calculator 552 stores object usage values as object usage data 568 in metadata 560 and bookkeeping engine 530 may query metadata 560 for the determination of object usage values 536.

In some embodiments, metadata store 550 may be distributed across multiple systems, such as a plurality of control nodes or access systems. Metadata store 550 and/or portions thereof may be sharded data stores, wherein the data stores are partitioned into segments stored in different computing systems. Storage interface 544 and/or object manager 546 may include functions for locating and accessing relevant portions of the sharded data base.

Memory 516 may include additional logic and other resources (not shown) for processing object data requests, such as modules for generating, queueing, validating, and otherwise managing object data requests. Processing of an object data request by storage interface 544 may include any number of intermediate steps that yield at least one data access request to object store 570.

In some embodiments, object store 570 may be logically organized based on the control entities discussed above. For example, the object store may be divided into a plurality of accounts 572. Each of these accounts 572 may contain one or more buckets 574 containing data objects 576. In some embodiments, users may be associated with accounts 572 and buckets 574 to determine access to objects 576.

Figure 6:
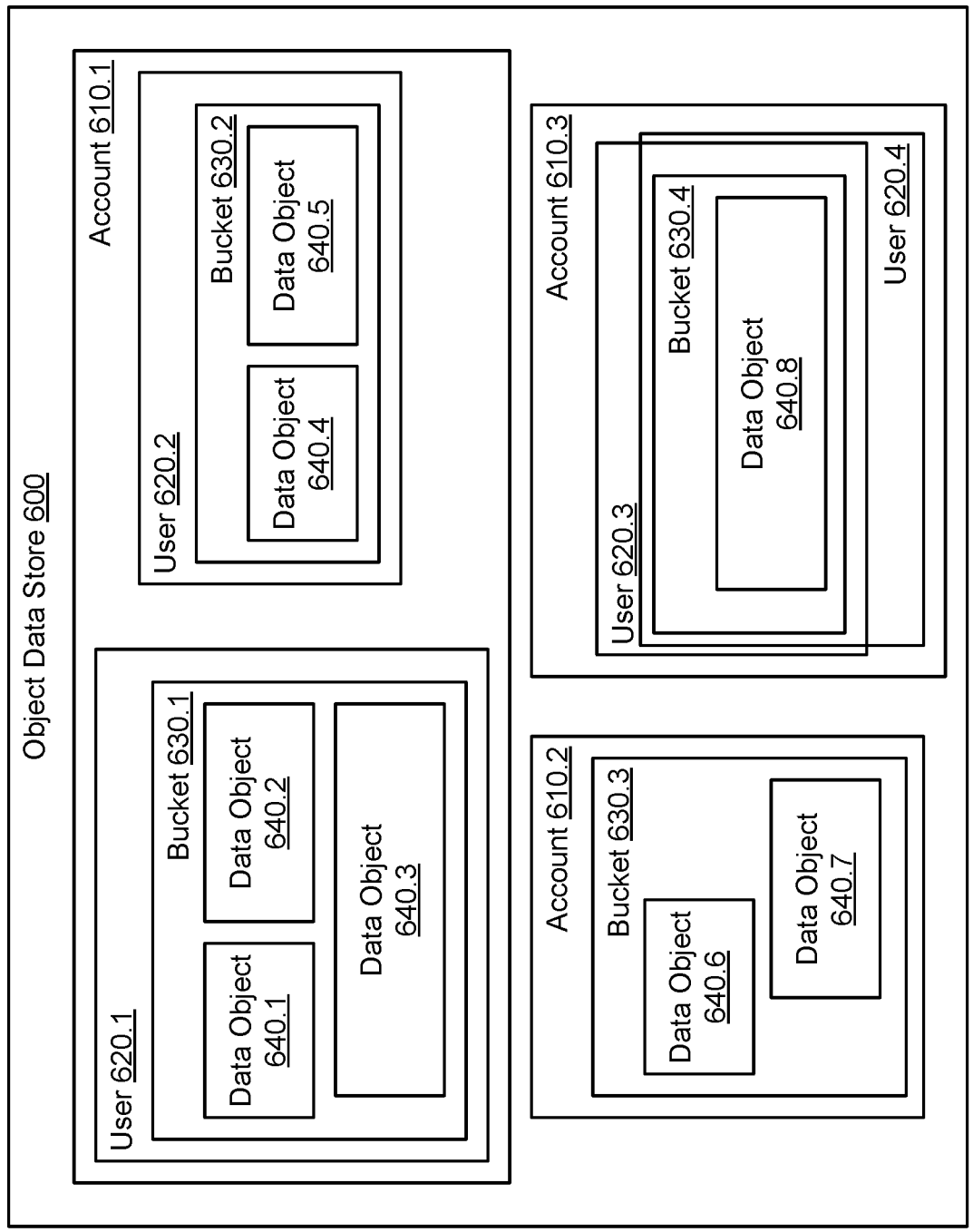
FIG. 6 schematically illustrates an example configuration of an object data store, such as the object data store in FIG. 5.

FIG. 6 shows the logical organization of an example object data store 600. For example, object data store 600 may include a plurality of control entities, such as object data store accounts, object data store users, and/or data object buckets, configured to access the various data objects. Object data store 600 may show an example of how a plurality of control entities may be associated with a plurality of data objects. Object data store 600 includes three accounts 610.1, 610.2, and 610.3. Account 610.2 supports two users 620.1 and 620.2 each of which has access to respective buckets 630.1 and 630.2. Bucket 630.1 includes three data objects 640.1, 640.2, and 640.3 of varying sizes, which are accessible to user 620.1. Bucket 630.2 includes two data objects 640.4 and 640.5, which are accessible to user 620.2. Account 610.2 does not have an associated user. Account credentials may be all that are required to access bucket 630.3. Bucket 630.3 includes two data objects 640.6 and 640.7. Account 610.3 supports a two users 620.3 and 620.4, both of whom have access to the same bucket 630.4. Bucket 630.4 includes one data object 640.8.

If a hard quota threshold for number of data objects is set at 4 and a soft quota threshold for number of data objects is set to 3 for all control entities, write access requests will be denied for account 610.1 and a warning will be issued for user 620.1 and bucket 630.1. Account 610.1 includes 5 data objects, exceeding the hard quota for the number of data objects and user 620.1 is associated with bucket 630.1, which includes 3 data objects. Note that in this case, both users 620.1 and 620.2 and buckets 630.1 and 630.2 will be impacted by the write denial because they are all associated with account 610.1. Accounts 610.2 and 610.3 and their respective buckets (and users) would be unaffected by the quotas so far.

Figure 7A:
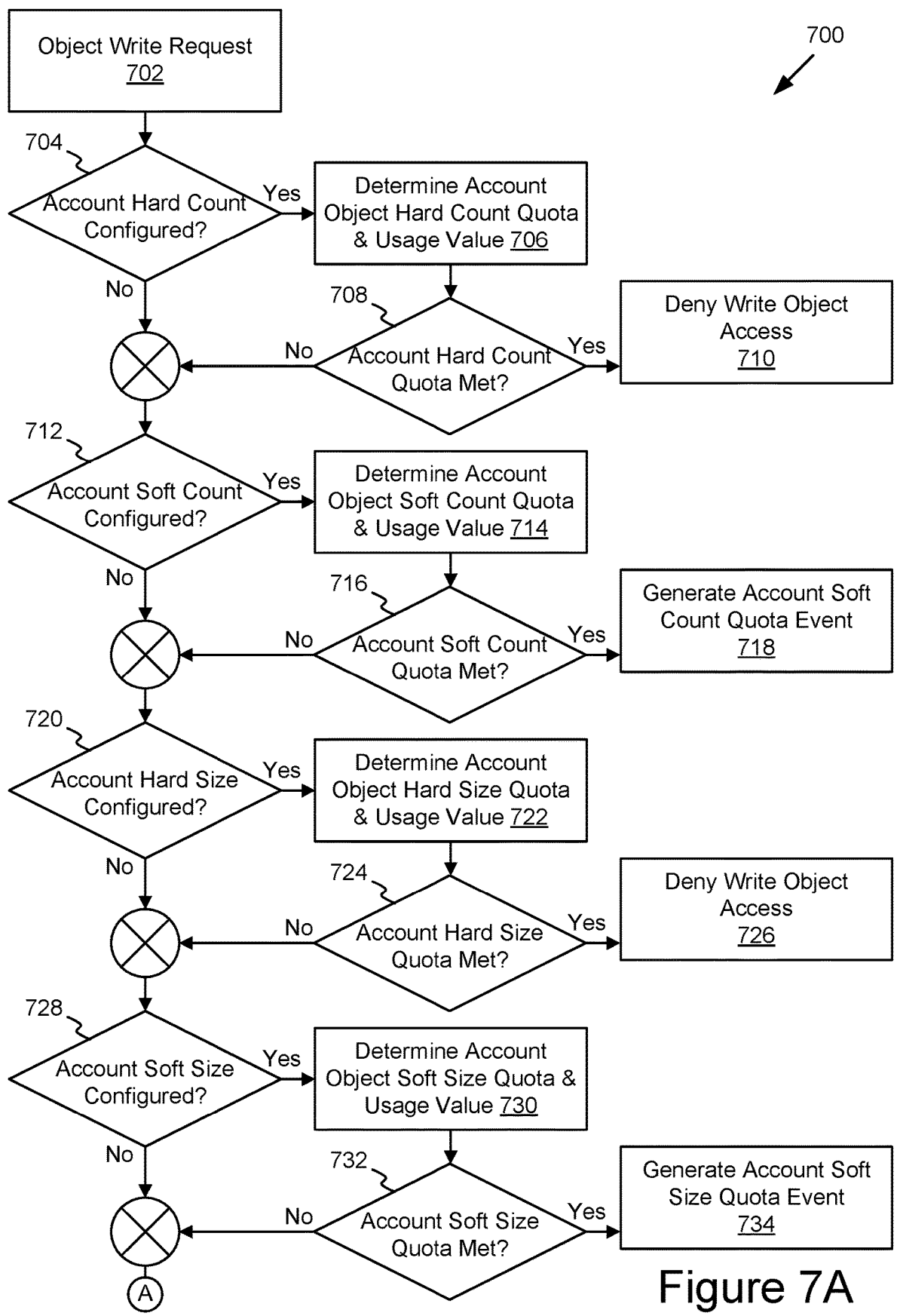
FIG. 7A-C illustrates an example method for enforcing quotas for a plurality of control entity types.
Figure 7B:
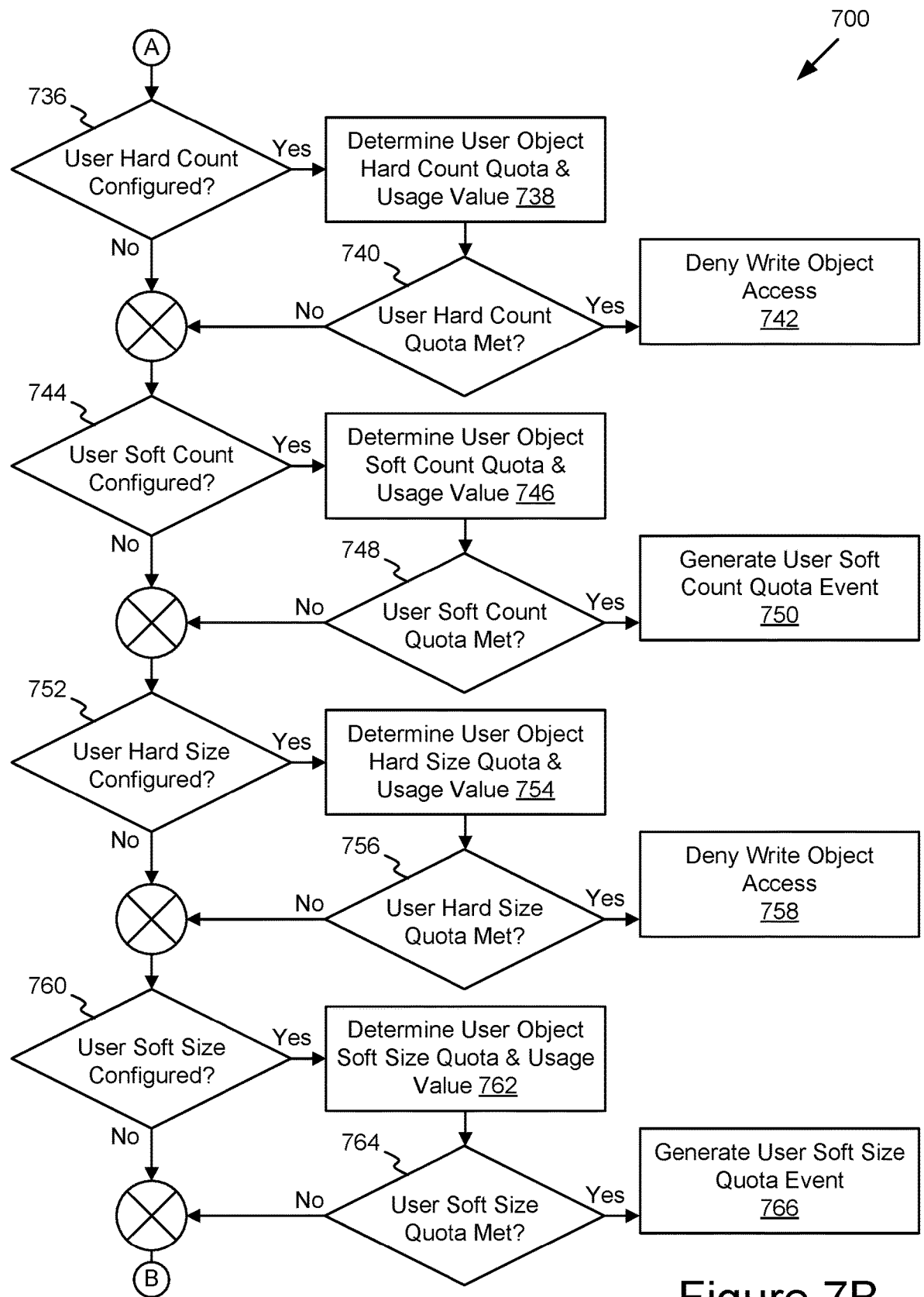
Figure 7C:
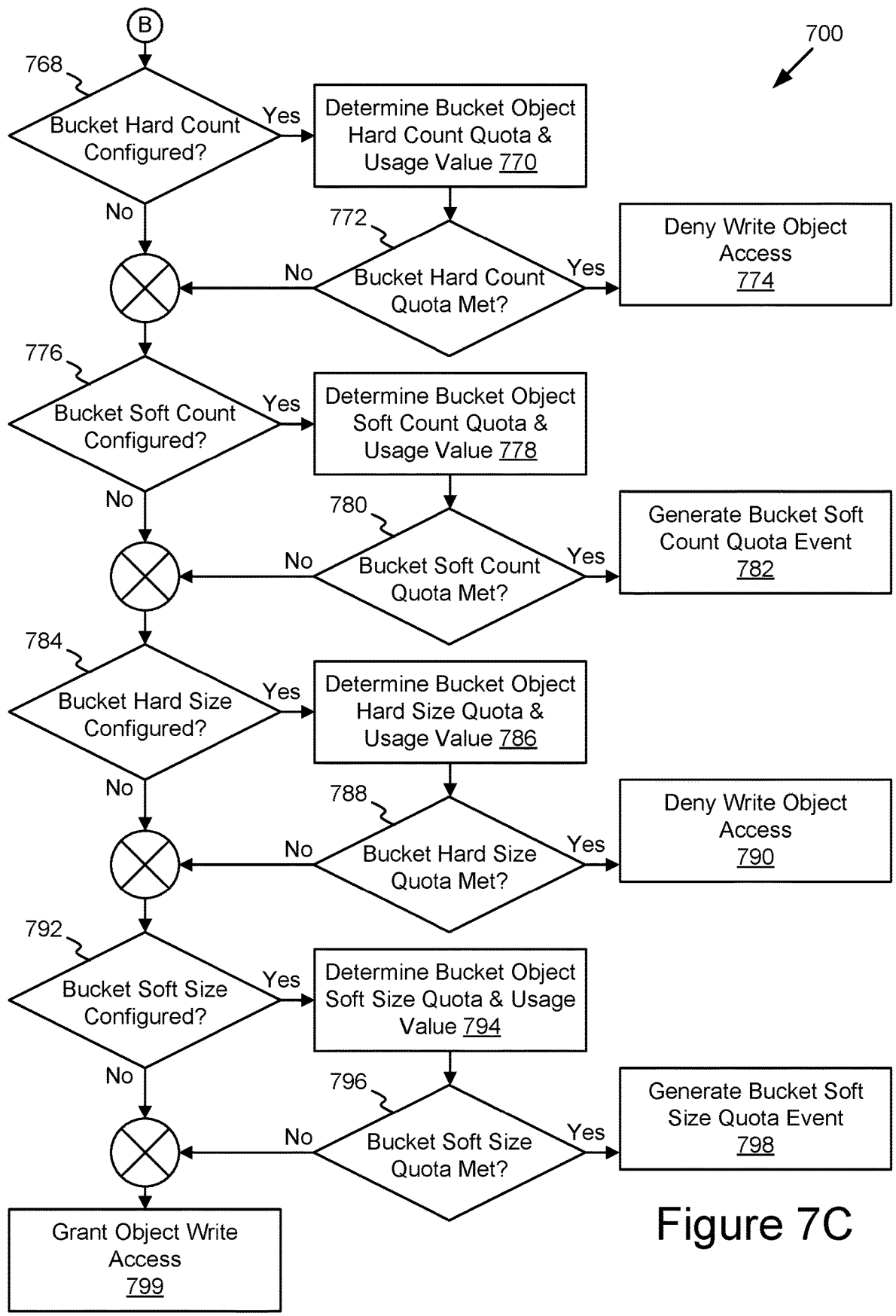

As shown in FIGS. 7A, 7B, and 7C (collectively FIG. 7), the object storage system 500 may be operated according to an example method for enforcing control entity quotas, i.e. according to the method 700 illustrated by the blocks 702-799 of FIG. 7. In the example shown, three control entity types (account, user, and bucket) are evaluated against two object usage parameters (count and size) at two different response levels (hard denial and soft warning event).

When an object storage system is configured for quota enforcement, a new data access request, such as an object write request, may be received at block 702. For example, a host write request may be received through a storage interface targeting a target data object stored in the object storage system. The object write request may be associated with a plurality of control entities identifiable from the target object. For example, the target data object may be contained in a target bucket that is accessible to a requesting user associated with a requesting account.

At block 704, the system may determine whether an account hard count quota has been configured. For example, the object storage system may include a processor configured to determine whether an account hard count quota is set in a control entity configurator, such as control entity configurator 520. If no, the account hard count quota check may be skipped and method 700 may proceed to the account soft count quota check at block 712. If yes, method 700 may proceed to block 706.

At block 706, the account object hard count quota threshold value and account object hard count usage value (e.g. a number of data objects value for the account) may be determined for the target data object. For example, the bookkeeping engine may retrieve quota threshold values and object usage values and compare them to determine whether the account object hard count quota has been exceeded. At block 708, whether or not the account object hard count quota threshold has been met (or exceeded) may be determined. If no, the account hard count quota check may be complete and method 700 may proceed to block 712. If yes, method 700 may proceed to block 710.

At block 710, write access to the target data object may be denied based on the account object hard count quota check. For example, an error message may be returned to the object write request that specifies that the account object hard count quota has been exceeded and write access has been denied to enforce this quota. In some embodiments (not shown), method 700 may continue to process the other quota checks in order to identify any other quota thresholds that have been exceeded and provide appropriate response.

At block 712, the system may determine whether an account soft count quota has been configured. For example, the object storage system may include a processor configured to determine whether an account soft count quota is set in a control entity configurator, such as control entity configurator 520. If no, the account soft count quota check may be skipped and method 700 may proceed to the account hard size quota check at block 720. If yes, method 700 may proceed to block 714.

At block 714, the account object soft count quota threshold value and account object soft count usage value may be determined for the target data object. For example, the bookkeeping engine may retrieve quota threshold values and object usage values and compare them to determine whether the account object soft count quota has been exceeded. At block 716, whether or not the account object soft count quota threshold has been met (or exceeded) may be determined. If no, the account soft count quota check may be complete and method 700 may proceed to block 720. If yes, method 700 may proceed to block 718.

At block 718, an account soft count quota event, such as a notification event, may be generated based on the account object soft count quota check. For example, a warning indicator may be triggered and a message may be sent to one or more users regarding the soft quota being exceeded and proximity to the hard quota limit (and denial of access). In some embodiments (not shown), method 700 may continue to process the other quota checks in order to identify any other quota thresholds that have been exceeded and provide appropriate response.

At block 720, the system may determine whether an account hard size quota has been configured. For example, the object storage system may include a processor configured to determine whether an account hard size quota is set in a control entity configurator, such as control entity configurator 520. If no, the account hard size quota check may be skipped and method 700 may proceed to the account soft size quota check at block 728. If yes, method 700 may proceed to block 706.

At block 722, the account object hard size quota threshold value and account object hard size usage value may be determined for the target data object. For example, the bookkeeping engine may retrieve quota threshold values and object usage values and compare them to determine whether the account object hard size quota has been exceeded. At block 724, whether or not the account object hard size quota threshold has been met (or exceeded) may be determined. If no, the account hard size quota check may be complete and method 700 may proceed to block 728. If yes, method 700 may proceed to block 726.

At block 726, write access to the target data object may be denied based on the account object hard size quota check. For example, an error message may be returned to the object write request that specifies that the account object hard size quota has been exceeded and write access has been denied to enforce this quota. In some embodiments (not shown), method 700 may continue to process the other quota checks in order to identify any other quota thresholds that have been exceeded and provide appropriate response.

At block 728, the system may determine whether an account soft size quota has been configured. For example, the object storage system may include a processor configured to determine whether an account soft size quota is set in a control entity configurator, such as control entity configurator 520. If no, the account soft size quota check may be skipped and method 700 may proceed to the user hard size quota check at block 736. If yes, method 700 may proceed to block 730.

At block 730, the account object soft size quota threshold value and account object soft size usage value may be determined for the target data object. For example, the bookkeeping engine may retrieve quota threshold values and object usage values and compare them to determine whether the account object soft size quota has been exceeded. At block 732, whether or not the account object soft size quota threshold has been met (or exceeded) may be determined. If no, the account soft size quota check may be complete and method 700 may proceed to block 736. If yes, method 700 may proceed to block 734.

At block 734, an account soft size quota event may be generated based on the account object soft size quota check. For example, a warning indicator may be triggered and a message may be sent to one or more users regarding the soft quota being exceeded and proximity to the hard quota limit (and denial of access). In some embodiments (not shown), method 700 may continue to process the other quota checks in order to identify any other quota thresholds that have been exceeded and provide appropriate response.

At block 736, the system may determine whether a user hard count quota has been configured. For example, the object storage system may include a processor configured to determine whether a user hard count quota is set in a control entity configurator, such as control entity configurator 520. If no, the user hard count quota check may be skipped and method 700 may proceed to the user soft count quota check at block 744. If yes, method 700 may proceed to block 738.

At block 738, the user object hard count quota threshold value and user object hard count usage value may be determined for the target data object. For example, the bookkeeping engine may retrieve quota threshold values and object usage values and compare them to determine whether the user object hard count quota has been exceeded. At block 740, whether or not the user object hard count quota threshold has been met (or exceeded) may be determined. If no, the user hard count quota check may be complete and method 700 may proceed to block 744. If yes, method 700 may proceed to block 742.

At block 742, write access to the target data object may be denied based on the user object hard count quota check. For example, an error message may be returned to the object write request that specifies that the user object hard count quota has been exceeded and write access has been denied to enforce this quota. In some embodiments (not shown), method 700 may continue to process the other quota checks in order to identify any other quota thresholds that have been exceeded and provide appropriate response.

At block 744, the system may determine whether a user soft count quota has been configured. For example, the object storage system may include a processor configured to determine whether a user soft count quota is set in a control entity configurator, such as control entity configurator 520. If no, the user soft count quota check may be skipped and method 700 may proceed to the user hard size quota check at block 752. If yes, method 700 may proceed to block 746.

At block 746, the user object soft count quota threshold value and user object soft count usage value may be determined for the target data object. For example, the bookkeeping engine may retrieve quota threshold values and object usage values and compare them to determine whether the user object soft count quota has been exceeded. At block 748, whether or not the user object soft count quota threshold has been met (or exceeded) may be determined. If no, the user soft count quota check may be complete and method 700 may proceed to block 752. If yes, method 700 may proceed to block 750.

At block 750, a user soft count quota event may be generated based on the user object soft count quota check. For example, a warning indicator may be triggered and a message may be sent to one or more users regarding the soft quota being exceeded and proximity to the hard quota limit (and denial of access). In some embodiments (not shown), method 700 may continue to process the other quota checks in order to identify any other quota thresholds that have been exceeded and provide appropriate response.

At block 752, the system may determine whether a user hard size quota has been configured. For example, the object storage system may include a processor configured to determine whether a user hard size quota is set in a control entity configurator, such as control entity configurator 520. If no, the user hard size quota check may be skipped and method 700 may proceed to the user soft size quota check at block 760. If yes, method 700 may proceed to block 754.

At block 754, the user object hard size quota threshold value and user object hard size usage value may be determined for the target data object. For example, the bookkeeping engine may retrieve quota threshold values and object usage values and compare them to determine whether the user object hard size quota has been exceeded. At block 756, whether or not the user object hard size quota threshold has been met (or exceeded) may be determined. If no, the user hard size quota check may be complete and method 700 may proceed to block 760. If yes, method 700 may proceed to block 758.

At block 758, write access to the target data object may be denied based on the user object hard size quota check. For example, an error message may be returned to the object write request that specifies that the user object hard size quota has been exceeded and write access has been denied to enforce this quota. In some embodiments (not shown), method 700 may continue to process the other quota checks in order to identify any other quota thresholds that have been exceeded and provide appropriate response.

At block 760, the system may determine whether a user soft size quota has been configured. For example, the object storage system may include a processor configured to determine whether a user soft size quota is set in a control entity configurator, such as control entity configurator 520. If no, the user soft size quota check may be skipped and method 700 may proceed to the bucket hard size quota check at block 768. If yes, method 700 may proceed to block 762.

At block 762, the user object soft size quota threshold value and user object soft size usage value may be determined for the target data object. For example, the bookkeeping engine may retrieve quota threshold values and object usage values and compare them to determine whether the user object soft size quota has been exceeded. At block 764, whether or not the user object soft size quota threshold has been met (or exceeded) may be determined. If no, the user soft size quota check may be complete and method 700 may proceed to block 768. If yes, method 700 may proceed to block 766.

At block 766, a user soft size quota event may be generated based on the user object soft size quota check. For example, a warning indicator may be triggered and a message may be sent to one or more users regarding the soft quota being exceeded and proximity to the hard quota limit (and denial of access). In some embodiments (not shown), method 700 may continue to process the other quota checks in order to identify any other quota thresholds that have been exceeded and provide appropriate response.

At block 768, the system may determine whether a bucket hard count quota has been configured. For example, the object storage system may include a processor configured to determine whether a bucket hard count quota is set in a control entity configurator, such as control entity configurator 520. If no, the bucket hard count quota check may be skipped and method 700 may proceed to the bucket soft count quota check at block 776. If yes, method 700 may proceed to block 770.

At block 770, the bucket object hard count quota threshold value and bucket object hard count usage value may be determined for the target data object. For example, the bookkeeping engine may retrieve quota threshold values and object usage values and compare them to determine whether the bucket object hard count quota has been exceeded. At block 772, whether or not the bucket object hard count quota threshold has been met (or exceeded) may be determined. If no, the bucket hard count quota check may be complete and method 700 may proceed to block 776. If yes, method 700 may proceed to block 774.

At block 774, write access to the target data object may be denied based on the bucket object hard count quota check. For example, an error message may be returned to the object write request that specifies that the bucket object hard count quota has been exceeded and write access has been denied to enforce this quota. In some embodiments (not shown), method 700 may continue to process the other quota checks in order to identify any other quota thresholds that have been exceeded and provide appropriate response.

At block 776, the system may determine whether a bucket soft count quota has been configured. For example, the object storage system may include a processor configured to determine whether a bucket soft count quota is set in a control entity configurator, such as control entity configurator 520. If no, the bucket soft count quota check may be skipped and method 700 may proceed to the user hard size quota check at block 784. If yes, method 700 may proceed to block 778.

At block 778, the bucket object soft count quota threshold value and bucket object soft count usage value may be determined for the target data object. For example, the bookkeeping engine may retrieve quota threshold values and object usage values and compare them to determine whether the bucket object soft count quota has been exceeded. At block 780, whether or not the bucket object soft count quota threshold has been met (or exceeded) may be determined. If no, the bucket soft count quota check may be complete and method 700 may proceed to block 784. If yes, method 700 may proceed to block 782.

At block 782, a bucket soft count quota event may be generated based on the bucket object soft count quota check. For example, a warning indicator may be triggered and a message may be sent to one or more users regarding the soft quota being exceeded and proximity to the hard quota limit (and denial of access). In some embodiments (not shown), method 700 may continue to process the other quota checks in order to identify any other quota thresholds that have been exceeded and provide appropriate response.

At block 784, the system may determine whether a bucket hard size quota has been configured. For example, the object storage system may include a processor configured to determine whether a bucket hard size quota is set in a control entity configurator, such as control entity configurator 520. If no, the bucket hard size quota check may be skipped and method 700 may proceed to the bucket soft size quota check at block 792. If yes, method 700 may proceed to block 786.

At block 786, the bucket object hard size quota threshold value and bucket object hard size usage value may be determined for the target data object. For example, the bookkeeping engine may retrieve quota threshold values and object usage values and compare them to determine whether the bucket object hard size quota has been exceeded. At block 788, whether or not the bucket object hard size quota threshold has been met (or exceeded) may be determined. If no, the bucket hard size quota check may be complete and method 700 may proceed to block 792. If yes, method 700 may proceed to block 790.

At block 790, write access to the target data object may be denied based on the bucket object hard size quota check. For example, an error message may be returned to the object write request that specifies that the bucket object hard size quota has been exceeded and write access has been denied to enforce this quota. In some embodiments (not shown), method 700 may continue to process the other quota checks in order to identify any other quota thresholds that have been exceeded and provide appropriate response.

At block 792, the system may determine whether a bucket soft size quota has been configured. For example, the object storage system may include a processor configured to determine whether a bucket soft size quota is set in a control entity configurator, such as control entity configurator 520. If no, the bucket soft size quota check may be skipped and method 700 may proceed to grant object write access at block 799. If yes, method 700 may proceed to block 794.

At block 794, the bucket object soft size quota threshold value and bucket object soft size usage value may be determined for the target data object. For example, the bookkeeping engine may retrieve quota threshold values and object usage values and compare them to determine whether the bucket object soft size quota has been exceeded. At block 796, whether or not the bucket object soft size quota threshold has been met (or exceeded) may be determined. If no, the bucket soft size quota check may be complete and method 700 may proceed to block 799. If yes, method 700 may proceed to block 798.

At block 798, a bucket soft size quota event may be generated based on the bucket object soft size quota check. For example, a warning indicator may be triggered and a message may be sent to one or more users regarding the soft quota being exceeded and proximity to the hard quota limit (and denial of access). In some embodiments (not shown), method 700 may continue to process other quota checks (not shown) in order to identify any other quota thresholds that have been exceeded and provide appropriate response.

At block 799, object write access or another storage operation may be granted in response to completing all quota checks. For example, the write operation responsive to the object write request received at block 702 may be completed by an object manager and an appropriate message returned upon completion. In some embodiments, generation of the various soft quota events may not prevent further quota checks and/or granting of object write access at block 799.

Figure 8:
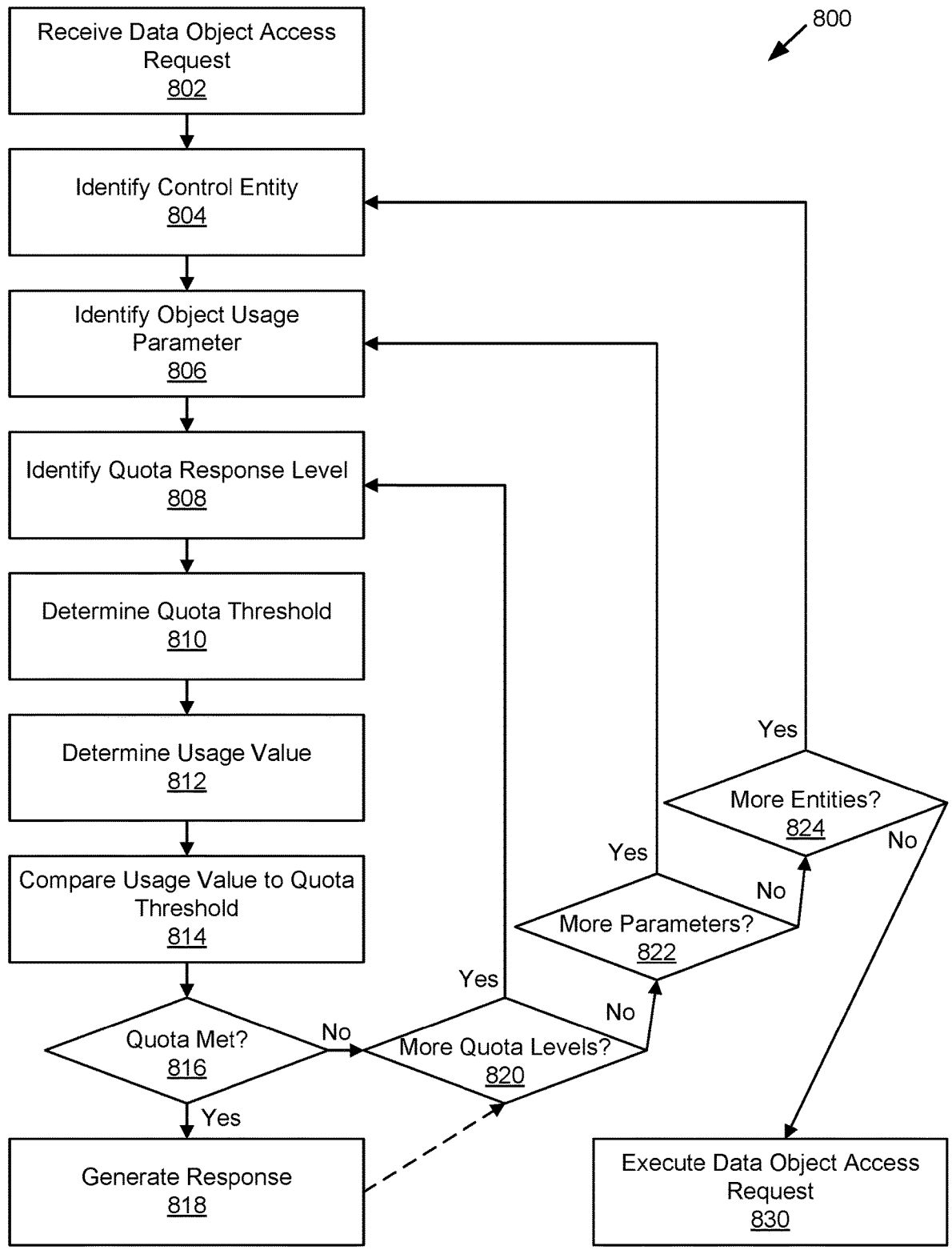
FIG. 8 illustrates an example method for enforcing quotas in response to a data object access request.

As shown in FIG. 8, the object storage system 500 may be operated according to an example method of iterative quota checks for enforcing bookkeeping quotas, i.e. according to the method 800 illustrated by the blocks 802-830 of FIG. 8. In some embodiments, method 800 may support any number of quota checks for the combinations of a plurality of control entity types, usage parameter types, and/or quota response levels.

At block 802, a data object access request may be received. For example, a data object access request may include host data requests for storage operations that read or modify data objects and/or their metadata. In some configurations, data access enforcement for quota violations may include read and/or metadata operations, in addition to write access, and any data object access request may trigger quota checks.

At block 804, at least one control entity may be identified from the data object access request and/or related metadata or session information. For example, an object storage command may identify a target data object associated with a specific account, user, and bucket. Each iteration through block 804 may select another control entity.

At block 806, at least one object usage parameter may be identified based on one or more quota thresholds configured for an identified control entity. For example, quota thresholds may be configured for a plurality of object usage parameters, such as total capacity, object size, object count, etc. Each iteration through block 806 may select another object usage parameter type for the identified control entity.

At block 808, at least one quota response level may be identified based on quota response levels configured for an identified object usage parameter. For example, quota thresholds may be configured for a plurality of quota response levels, such as hard and soft quota response levels. Each iteration through block 808 may select another quota response level for the identified usage parameter type and identified control entity.

At block 810, a quota threshold may be determined. For example, the quota threshold value corresponding to the combination of control entity, object usage parameter, and quota response level may be calculated or retrieved.

At block 812, an object usage value may be determined. For example, the object usage value corresponding to the combination of control entity and object usage parameter may be calculated or retrieved.

At block 814, the object usage value may be compared to the quota threshold value to determine whether the quota threshold is met (or exceeded). For example, a comparator function may determine whether the object usage value exceeds the corresponding quota threshold value. At block 816, method 800 may determine whether the quota being evaluated has been met. If yes, method 800 may proceed to block 818. If not, method 800 may proceed to block 820.

At block 818, a response to the quota being met or exceeded may be generated. For example, a soft quota violation may generate a notification or warning message, while a hard quota violation may both generate an error or warning, as well as denying the data object access request. In some embodiments, any response that denies the data object access request may terminate the quota check or may still permit evaluation of other quotas to provide a more complete notification. If the response does not prevent the data object access request, method 800 may continue with evaluating additional quota checks at block 820.

At block 820, whether more quota response levels remain to be checked may be determined. If yes, method 800 may return to identify a next quota response level at block 808. If no, method 800 may proceed to block 822.

At block 822, whether more object usage parameters remain to be checked may be determined. If yes, method 800 may return to identify a next object usage parameter at block 806. If no, method 800 may proceed to block 824.

At block 824, whether more control entities remain to be checked may be determined. If yes, method 800 may return to identify a next control entity at block 804. If no, method 800 may proceed to block 830.

At block 830, the data object access request may be executed. For example, the data object access request that initiated method 800 may be allowed to complete processing and return the appropriate data or completion message for the storage operation.

Figure 9:
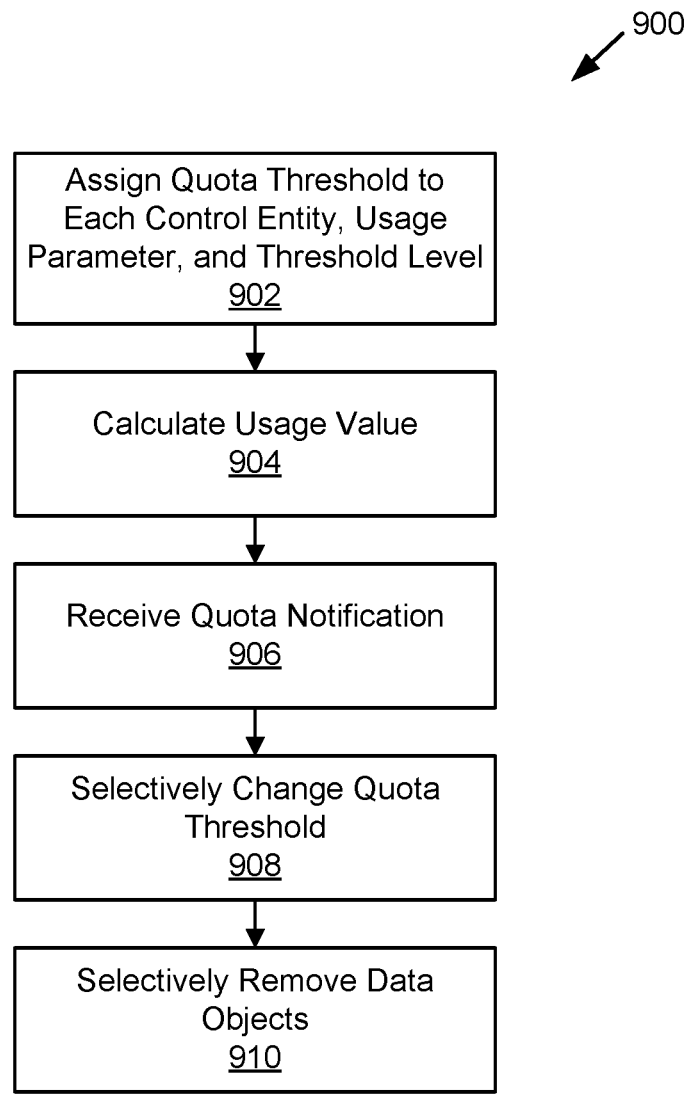
FIG. 9 illustrates an example method for responding to a quota notification.

As shown in FIG. 9, the object storage system 500 may be operated according to an example method of automatically responding to quota status notifications, i.e. according to the method 900 illustrated by the blocks 910-940 of FIG. 9. For example, object storage system 500 may be configured to automatically adjust quota thresholds, execute storage operations (such as deleting object or running garbage collection), or otherwise take action to enforce quotas (and related service levels or billing terms).

At block 902, quota thresholds may be assigned for each control entity, usage parameter, and threshold level. For example, a storage service provider and/or system administrator may define service, billing, or usage levels for various accounts, users, and applications (which may correspond to bucket allocations) using a control entity configurator. In some embodiments, quota thresholds may be configured with automated actions in response to quotas being exceeded.

At block 904, usage values are calculated for use in quota evaluation based on the data objects. For example, an object usage calculator may operate independent of the bookkeeping engine to aggregate and monitor object usage for various system utilities, including the bookkeeping engine.

At block 906, a quota notification may be received indicating that a quota threshold has been exceeded by a corresponding usage value. For example, one or more quota thresholds may have been evaluated as described with regard to methods 800 and 900 and a quota status notification may have been sent to another system or component for responding to the notification.

At block 908, a quota threshold may be selectively changed in response to a quota notification. For example, the quota notification may trigger a graphical user interface to display the notification, along with options to change the quota threshold for one or more control entities. In some embodiments, changes in quota threshold may be constrained by or determine billing levels and/or allocation of limited resource pools among control entities.

At block 910, one or more data objects may be selectively removed in response to a quota notification. For example, the quota notification may trigger a graphical user interface to display the notification, along with options for removing data objects that are contributing to the object usage overage. In some embodiments, the quota notification may trigger garbage collection to remove any outdated objects identified for removal that may still be counting against one or more thresholds. In some embodiments, an object retention policy may be applied to identify data objects that may be removed or archived to a different system.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
an object data store configured to enable a plurality of control entities to access data objects associated with each control entity of the plurality of control entities; and
a bookkeeping engine configured to:
  determine a plurality of quota thresholds associated with a requesting control entity of the plurality of control entities, wherein the plurality of quota thresholds includes:
    a first quota threshold corresponding to a first storage usage quota for the requesting control entity; and
    a second quota threshold corresponding to a second storage usage quota for the requesting control entity;
  determine at least one object usage value corresponding to the plurality of quota thresholds;
  generate, responsive to the at least one object usage value exceeding the first quota threshold associated with the requesting control entity, a notification event; and
  deny, responsive to the at least one object usage value exceeding the second quota threshold associated with the requesting control entity, a data object access request from the requesting control entity.

2. The system of claim 1, wherein the plurality of control entities includes control entities selected from:
data object buckets;
user profiles; and
object data store accounts.

3. The system of claim 1, wherein:
the first quota threshold is a percentage of the second quota threshold; and
the percentage is less than one hundred percent.

4. The system of claim 1, wherein:
the at least one object usage value includes a plurality of object usage values corresponding to the plurality of quota thresholds; and
the bookkeeping engine is further configured to:
  responsive to the data object access request:
    execute determining the at least one object usage value for each object usage value of the plurality of object usage values; and
    execute denying the data object access request responsive to at least one quota threshold of the plurality of quota thresholds being exceeded by a corresponding object usage value of the plurality of object usage values.

5. The system of claim 1, wherein:
the plurality of quota thresholds associated with the requesting control entity is selected from:
  a number of data objects;
  a storage capacity; or
  a transactional threshold; and
the at least one object usage value is selected from a corresponding:
  number of data objects value;
  storage capacity value; or
  transactional value.

6. The system of claim 1, wherein the bookkeeping engine is further configured to respond to each write request to the object data store.

7. The system of claim 1, further comprising:
a control entity configurator configured to:
  assign a plurality of quota thresholds to each control entity of the plurality of control entities; and
  selectively change, responsive to the at least one object usage value exceeding at least one quota threshold of the plurality of quota thresholds associated with the requesting control entity, at least one quota threshold of the plurality of quota thresholds associated with the requesting control entity.

8. The system of claim 1, further comprising:
an object usage calculator configured to calculate the at least one object usage value based on data objects in the object data store; and
an object manager configured to remove, responsive to the at least one object usage value exceeding at least one quota threshold of the plurality of quota thresholds associated with the requesting control entity, data objects from the object data store.

9. The system of claim 1, wherein:
the plurality of control entities includes a plurality of control entity types;
the requesting control entity includes control entity identifiers for the plurality of control entity types; and
the bookkeeping engine is further configured to:
  responsive to the data object access request:

execute determining the plurality of quota thresholds for each control entity identifier for the plurality of control entity types;

execute determining the at least one object usage value for each control entity identifier for the plurality of control entities; and execute denying the data object access request responsive to at least one quota threshold for a control entity identifier of the requesting control entity being exceeded by a corresponding object usage value of the control entity identifier of the requesting control entity.

10. A computer-implemented method, comprising:

receiving a data object access request associated with a requesting control entity, wherein the requesting control entity is configured to access data objects associated with the requesting control entity;

determining a plurality of quota thresholds associated with the requesting control entity;

determining a plurality of object usage values including at least one object usage value corresponding to each quota threshold of the plurality of quota thresholds, wherein each quota threshold of the plurality of quota thresholds corresponds to a storage usage quota; and denying, responsive to at least one quota threshold of the plurality of quota thresholds being exceeded by a corresponding object usage value of the plurality of object usage values associated with the requesting control entity, the data object access request from the requesting control entity.

11. The computer-implemented method of claim 10, wherein:

the data objects are stored in an object data store;

the requesting control entity is a control entity from a plurality of control entities associated with the object data store; and each control entity of the plurality of control entities is associated with at least one data object in the object data store.

12. The computer-implemented method of claim 11, wherein the plurality of control entities includes control entities selected from:

data object buckets;
user profiles; and
object data store accounts.

13. The computer-implemented method of claim 11, further comprising:

assigning at least one quota threshold to each control entity of the plurality of control entities; and selectively changing, responsive to the at least one object usage value exceeding the at least one quota threshold associated with the requesting control entity, at least one quota threshold associated with the requesting control entity.

14. The computer-implemented method of claim 10:
wherein:
the plurality of quota thresholds associated with the requesting control entity includes:
a first quota threshold; and
a second quota threshold; and
denying the data object access request is responsive to the at least one object usage value corresponding to the second quota threshold exceeding the second quota threshold; and further comprising:

generating, responsive to the at least one object usage value corresponding to the first quota threshold exceeding the first quota threshold, a notification event.

15. The computer-implemented method of claim 14, wherein:

the first quota threshold is a percentage of the second quota threshold; and the percentage is less than one hundred percent.

16. The computer-implemented method of claim 10, wherein:

the plurality of quota thresholds associated with the requesting control entity is selected from:
a number of data objects;
a storage capacity; or
a transactional threshold; and
the plurality of object usage values is selected from a corresponding:
number of data objects value;
storage capacity value; or
transactional value.

17. The computer-implemented method of claim 10, further comprising:

calculating the plurality of object usage values based on data objects associated with the requesting control entity in an object data store; and removing, responsive to the at least one object usage value exceeding the corresponding at least one quota threshold associated with the requesting control entity, data objects associated with the requesting control entity from the object data store.

18. The method of claim 10, wherein:

the requesting control entity includes control entity identifiers for a plurality of control entity types; and the plurality of quota thresholds associated with the requesting control entity include at least one quota threshold for each control entity identifier of the plurality of control entity types.

19. The method of claim 10, wherein:

the requesting control entity is associated with a plurality of object usage parameter types and a plurality of quota response levels; and the plurality of quota thresholds associated with the requesting control entity include quota thresholds for combinations of an object usage parameter type from the plurality of object usage parameter types and a quota response level from the plurality of quota response levels.

20. A system, comprising:

an object data store configured to enable a requesting control entity to access data objects associated with the requesting control entity;

means for receiving a data object access request associated with the requesting control entity;

means for determining a plurality of quota thresholds associated with the requesting control entity, wherein the plurality of quota thresholds includes:
a first quota threshold corresponding to a first storage usage quota for the requesting control entity; and
a second quota threshold corresponding to a second storage usage quota for the requesting control entity;

means for determining at least one object usage value corresponding to the plurality of quota thresholds;

means for generating, responsive to the at least one object usage value exceeding the first quota threshold associated with the requesting control entity, a notification event; and means for denying, responsive to the at least one object usage value exceeding the second quota threshold associated with the requesting control entity, a data object access request from the requesting control entity.

* * * * *